July 7, 1942.   W. R. RAMSAUR   2,288,599
OIL COOLER HAVING PROTECTION VALVE WITH SLIDE
VALVE AND BIMETALLIC THERMOSTAT
Filed Sept. 2, 1941   2 Sheets-Sheet 1
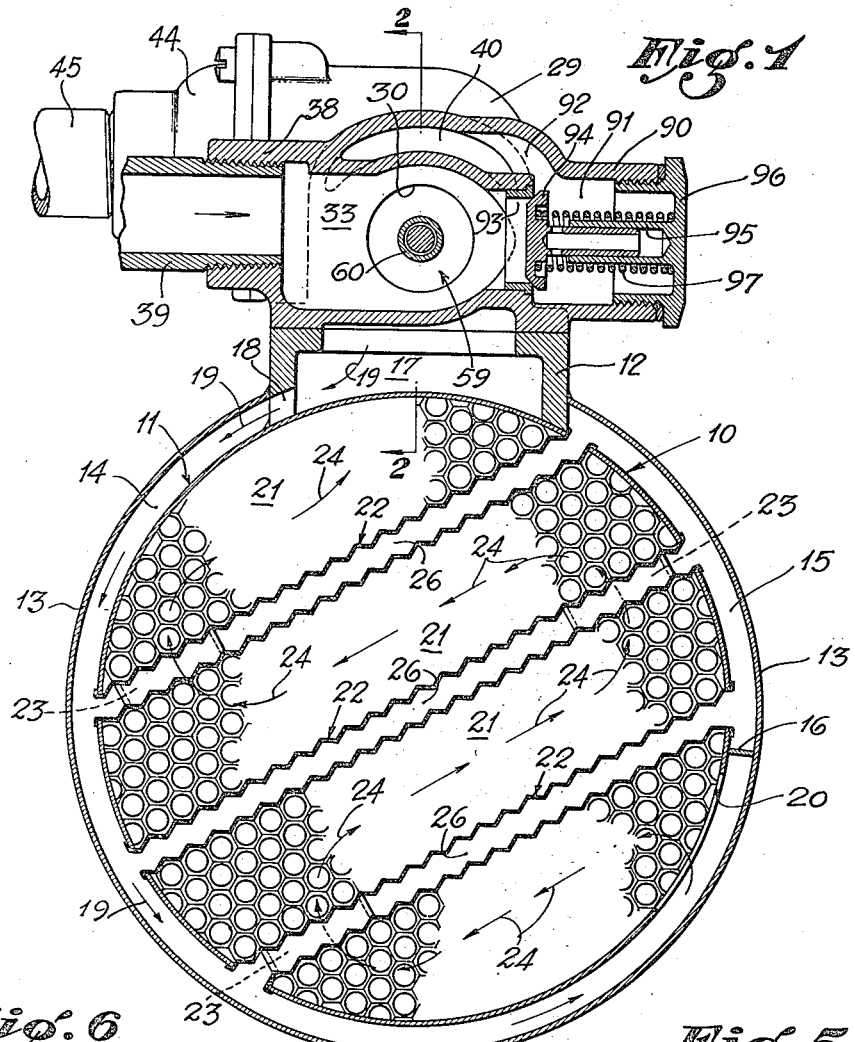
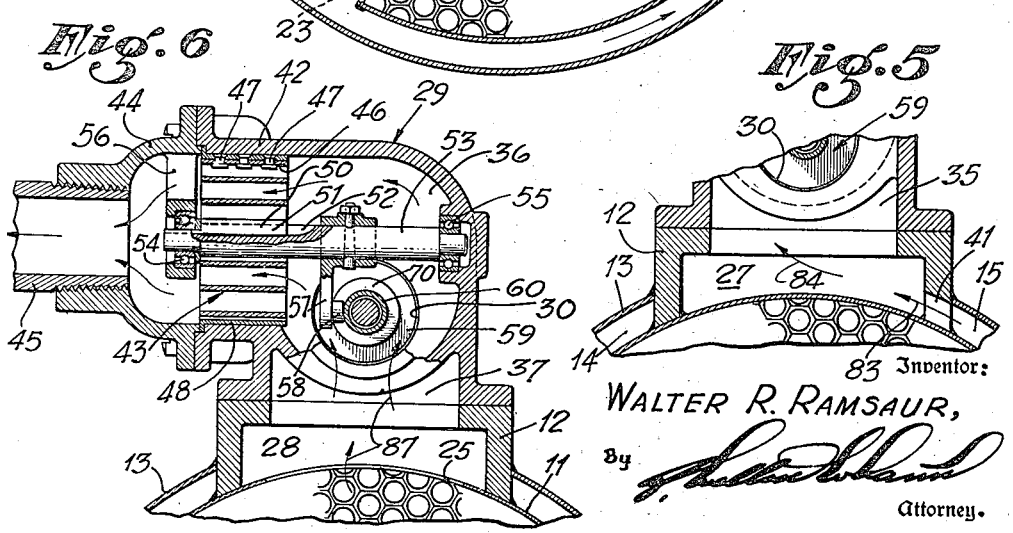
Inventor:
WALTER R. RAMSAUR,
By
Attorney.

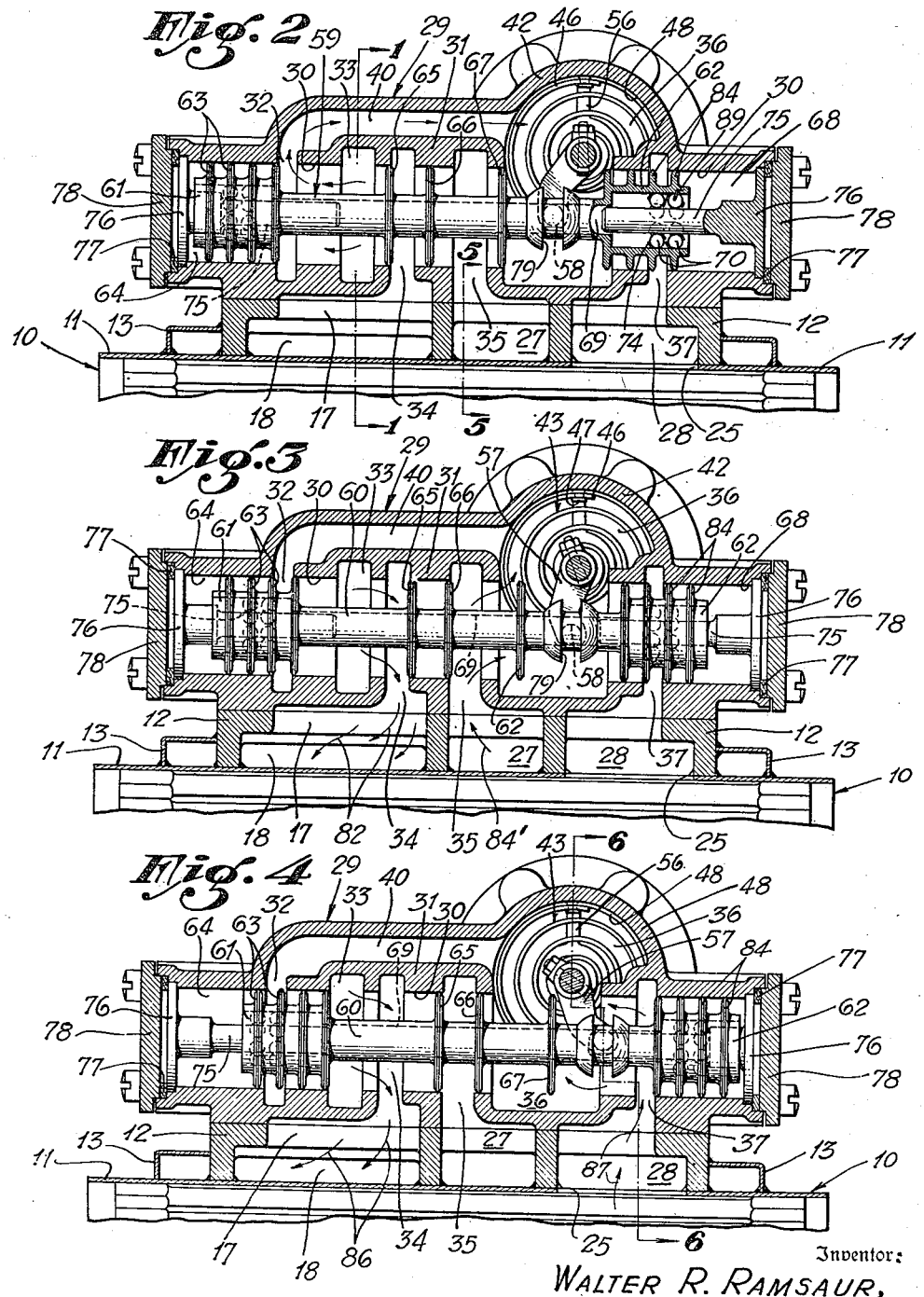

Patented July 7, 1942

2,288,599

UNITED STATES PATENT OFFICE 2,288,599

OIL COOLER HAVING PROTECTION VALVE WITH SLIDE VALVE AND BIMETALLIC THERMOSTAT

Walter R. Ramsaur, Los Angeles, Calif., assignor to The Garrett Corporation, Airesearch Manufacturing Company Division, Los Angeles, Calif., a corporation of California Application September 2, 1941, Serial No. 409,259

15 Claims. (Cl. 257—2)

My present invention relates to means employed in the cooling of crank case oil of internal combustion engines, and relates in particular to a cooling device having a novel control valve for the oil, rendering the cooler especially suitable for use with aircraft engines.

An object of the invention is to provide with the cooler of the class described means for controlling the flow of oil with relation to and through the cooler whereby the cooler will be protected from destructive pressure and whereby the action of the cooler will be to keep the oil which is circulating through a system at a temperature and viscosity within a selected range.

A further object of the invention is to provide a novel valve device having a slide valve operated through consecutive positions within a casing associated with an oil cooler, and means for moving this slide valve through its different positions in accordance with the changes in temperature in a specified locality or zone of the system in which the oil is circulated.

It is also an object of the invention to provide a valve device of the character set forth in the foregoing having means operative to carry the oil through a path entirely outside the cooler during the time the oil in the piping and in the cooler is cold. By the use of this arrangement, the cooler is protected from heavy oil pressures which may develop in the oil circulating system due to the congealing of oil therein at low temperature.

A further object of the invention is to provide a slide valve for use in controlling the flow of oil with relation to a cooler having a form whereby frictional resistance to movement of the valve is minimized, and wherein fluid pressures against the ends of the valve are balanced.

A further object is to provide in a valve of this character means for supporting the valve for free movement, this means comprising a novel rolling type of bearing to support the end portions of the slide valve.

A further object is to provide a simple control device wherein a simple thermostat and operative connnection between the thermostat and the slide valve are employed.

Among the objects of the invention are to provide a device which will automatically act to maintain within a given range the oil returned to the engine and reduce the warm-up period to a minimum.

Further objects and advantages of the invention will be brought out in the following part of the specification.

Referring to the drawings, which are for illustrative purposes only:

Fig. 1 is a sectional view showing a preferred form of my invention, this view being sectioned on the plane 1—1 of Fig. 2.

Fig. 2 is a sectional view taken as indicated by the line 2—2 of Fig. 1, showing the slide valve in the first position thereof.

Fig. 3 is a view similar to Fig. 2, but showing the slide valve in its second position.

Fig. 4 is also a sectional view similar to Fig. 2, but showing the slide valve in its third position.

Fig. 5 is a fragmentary sectional view taken as indicated by the line 5—5 of Fig. 2.

Fig. 6 is a fragmentary sectional view taken as indicated by the line 6—6 of Fig. 4, this view showing the thermostat in cross-section.

In Fig. 1 I have shown an oil cooler 10 having a cylindric shell 11 open at both ends. A fitting 12 is secured to the upper part of the shell and a thin metal wall 13, commonly referred to as the muff of the cooler, is carried from one side of the fitting 12 entirely around and in spaced relation to the shell 10 to the opposite side of the fitting 12, to provide an external warm-up space 14 and a fluid outlet space 15, the spaces 14 and 15 being separated by a wall 16.

The fitting 12 has an inlet chamber or port 17 which is in fact the common inlet for the warm-up spaces of the cooler and also the cooling spaces, as will be hereinafter described. In the normal operation of the cooler, oil flows from the port 17 through an opening 18 in the wall of the fitting 12, as indicated by the arrows 19. This oil flows through the space 14 to an inlet opening 20 for the cooler, situated near the partition wall 16. The interior of the cooler is divided into cooling spaces 21 by hollow baffles 22, which are extended from side to side of the shell and have intercommunicating openings 23 therethrough so that the oil may flow from the inlet 20 consecutively back and forth through the cooling spaces 21, as indicated by arrows 24, to an exit opening 25 in the upper part of the shell 11, as indicated in Fig. 6. The hollow baffles 22 are so placed that the passages 26 formed thereby will connect the spaces 14 and 15 within the outer wall or muff 13.

As shown in Fig. 2, the fitting 12 has transverse partition walls to divide the interior space thereof into the common inlet port 17, a warm-up exit chamber 27, and a cooler exit chamber 28. A casing 29, forming a cooperative part of a control valve structure, is secured to the fitting 12 in the position shown in the drawings. This casing, as best shown in Figs. 2 to 4 inclusive, has a bore 30 extending from end to end thereof. A number of valve ports communicate through the wall 31 of the bore 30, with the interior of such bore, in the arrangement and for the purpose to be hereinafter described.

In viewing the casing 29, as in Fig. 2, it will be perceived that progressing from left to right, the following ports communicate with the interior of the bore 30 through the wall 31:

Direct flow port 32; inlet port 33; common entrance port 34 for the bypass and cooling spaces of the cooler; warm-up exit port 35; outlet port 36; and cooling space exit port 37.

As shown in Fig. 1, the inlet port 33 is formed in part by a threaded boss 38 to which the oil delivery pipe 39 of the oil circulating system is connected. As shown in Fig. 2, the direct flow port 32 is connected through a direct flow passage 40 with the outlet port 36, this passage 40 extending over the top of the wall 31 in which the bore 30 is formed. The common entrance port 34 communicates with the inlet chamber 17 of the fitting 12, and therefore serves as an entrance for oil which is to flow through the warm-up spaces 14 and 26, or through the cooling spaces 21 of the cooler. The warm-up exit port 35 communicates, as shown in Figs. 2 and 5, with the chamber 27. This chamber 27 communicates through an opening 41, Fig. 5, with the upper end of the space 15 within the muff 13, so that during certain times oil from the warm-up spaces of the cooler may flow out through the port 35.

The outlet port 36, as shown in Figs. 2 and 6, is of relatively large size and includes a cylindric outlet wall 42 within which a thermostat 43 may be secured, and to which a flanged fitting 44 may be attached to provide means for connecting the outlet to the return piping 45 of the oil circulating system. The port 37 may be referred to as the cooler exit port for the reason that it communicates with the chamber 28 and may receive through this chamber 28 the oil which flows out of the cooling spaces of the cooler through the outlet port 25 in the shell 11, as shown in Fig. 6.

The thermostat 43 comprises a spiral of fine metallic thermostat stock, the outer end 46 thereof being connected by rivets 47 to the upper portion of a flanged tubular holder 48 which is received in the opening provided by the cylindric wall 42 prior to the placing of the fitting 44 and is clamped in place by the fitting 44. The inner end 50 of the spiral thermostat 43 has an inwardly bent, radially disposed, lip 51 to engage a slot 52 in a shaft 53 which is supported for rotation by the thermostat through use of bearings 54 and 55, Fig. 6. The bearing 54 is supported by a bracket 56 extended radially inwardly from the wall of the fitting 44, and the bearing 55 is supported in the wall of the casing 29. A crank 57 is fixed on the shaft 53 so as to project downward, this crank 57 having a cylindric boss 58.

A slide valve 59 is arranged for axial movement in the bore 30 of the casing 29. This slide valve 59 comprises a tube 60 with cylindric enlargements 61 and 62 at the ends thereof. The cylindric enlargement 61 has thereon a plurality of radial flanges 63 which lie within the leftward end 64 of the bore 30 when the slide valve 59 is in its first position, as shown in Fig. 2. The cylindric enlargement 62 has similar radial flanges 84 positioned so as to obstruct the cooler exit port 37 when the slide valve 59 is in its first position, shown in Fig. 2. The slide valve 59 has means for obstructing the common entrance port 34 and also means for closing the bore 30 between the warm-up exit port 35 and the outlet port 36, such means comprising discs or radial flanges 65, 66, and 67. The disc 65 is positioned so as to constitute a barrier in the bore 30 between the inlet port 33 and the common entrance port 34, the disc 66 is positioned so as to constitute a barrier between the common entrance port 34 and the warm-up exit port 35, and the disc 67 is positioned so as to constitute a third barrier which will prevent a flow of fluid in either direction between the ports 35 and 36. The radial flanges and discs 63, 84, 65, 66, and 67 have sharp peripheral edges lying in close proximity to the wall of the bore 30. The purpose of sharpening these edges in the manner shown is so that the slide valve 59 will have no large surface areas confronting the wall of the bore 30 and so that therefore resistance to movement of the slide valve 59 by friction of oil between the confronting surfaces of the slide valve and of the bore will be minimized.

The end spaces 64 and 68 of the bore 30 are connected through the opening or passage 69 which extends from end to end of the slide valve 59. Accordingly, there may be a free flow of fluid from end to end of the slide valve 59 to accomplish a balancing of the pressure of oil applied to the ends of the slide valve 59, and likewise there may be a shifting of oil from one end space 64 and 68 to the other through the passage 69 of the slide valve 59, as the slide valve is moved axially in the bore 30. Roller type bearing means 89 support the slide valve 59 for axial movement in the bore 30. These roller type bearing means 89 comprise steel balls 70 held by retainers 74 within the the cylindric enlargements 61 and 62 and in positions surrounding axially aligned pins 75 supported by end plates 76 clamped in position by gaskets 77 when cover plates 78 for the ends of the bore 30 are secured in place. The slide valve 59 has an annular channel 79 positioned so as to be engaged by the boss 58, whereby the thermostat 43 may act through the crank 57 to move the slide valve 59 between the three positions thereof, shown in Figs. 2, 3, and 4.

The action of the thermostat 43 is determined in accordance with the existing conditions of operation. The following is an average example. When the thermostat 43 is relatively cold, that is to say—below 60° F. or 70° F.—it will hold the slide valve in its first position shown in Fig. 2. As the thermostat is gradually warmed, the slide valve 59 will be moved rightward, and when the thermostat is relatively warm, for example, around 125° F., the slide valve will have been moved into its second position shown in Fig. 3, and when the thermostat is relatively hot, for example, around 175° F., the slide valve will be in its third position shown in Fig. 4.

When the slide valve 59 is in its first position, the closure means represented by the members 63, lies to the left of the port 32, leaving the direct flow passage 40 in open communication with the inlet port 33, so that when the oil is relatively cold, it may flow from the inlet port 33 to the outlet port 36 and thence through the return piping 45 back to the engine. At this time the ports 34, 35, and 37 are obstructed so that there can be no flow therethrough in either forward or reversed direction into the cooler.

As the slide valve 59 is moved rightward due to the warming up of the oil which passes through the spaces between the turns of the thermostat 43, the direct flow of port 32 will be gradually closed from communication with the inlet port 33, the common entrance port 34 will be gradually opened to communication with the inlet port 33, and the barrier 67 will move rightward toward the position thereof shown in Fig. 3 so that oil may flow from the warm-up exit port 35 to the outlet port 36. At this time oil will flow as indicated by the arrows 82, Fig. 3, from the inlet port 33, through the entrance port 34, and the entrance chamber 17 of the fitting 12, from whence it will flow, as shown by arrows 19, in Fig. 1, into the space 14. From the space 14 the warm oil will flow through the spaces 26 of the hollow baffles 22 into the space 15, and as shown by arrows 83 in Fig. 5, will flow into the chamber 27 and then from the chamber 27 through the port 35, as indicated by arrows 84' in Fig. 3. This flow of oil through the warm-up spaces of the cooler will continue while the slide valve 59 passes through its second position of Fig. 3 toward its third position of Fig. 4.

There will be a gradual movement of the barrier 66 from its position of Fig. 3 toward its position of Fig. 4 so as to accomplish a gradual closing of the warm-up exit port 35, and the closure means represented by the flange members 84 at the rightward end of the slide valve 59 will be gradually moved toward the position thereof shown in Fig. 4, the result being that the flow of oil through the common entrance port 34 will be gradually transferred from the warm-up passages of the cooler to the cooling spaces 21 of the cooler, in view of the gradual opening of the cooler space exit port 37. When the slide valve moves completely into its third position as shown in Fig. 4, the entire flow of oil will be inward from the inlet port 33 as indicated by arrows 86, then through the space 14 and through the cooling spaces 21 of the cooler, as indicated by the arrows 19 and 24, Fig. 1, and the oil will be finally discharged through the exit port 37 to the outlet port 36 as indicated by arrows 87 in Figs. 4 and 6.

As an additional safety measure, I provide a pressure relief valve between the inlet port 33 and the direct flow passage 40 which leads to the outlet port 36. As shown in Fig. 1, there is a cylindrical wall 90 aligned with and opposite to the cylindrical wall 38 provided for connection of the inlet piping 39. The valve chamber 91 formed by the wall 90 communicates through a passage 92 with the direct flow passage 40, and the chamber 91 communicates with the inlet port 33 through a bypass port 93. A spring pressed pressure relief valve 94 is guided by a sleeve 95 which projects inward from a plug 96 adapted to close the chamber 91. A spring 97 may be provided having a strength to permit yielding of the valve 94 from its position to close the bypass port 93, at the pressure selected as the maximum to which the interior of the cooler is to be subjected through the inlet port 33.

I claim as my invention:

1. In an oil cooling device of the class described, the combination of: a cooler having walls forming a cooling space in which the oil to be cooled is brought into heat exchange relation to a cooling medium, and a warm-up space contiguous to said cooling space through which heated oil may be passed for the purpose of warming up the walls of said cooling space; an axially slidable valve; thermostat means exposed to a flow of said fluid, said thermostat means being connected to said valve and operating to move the same between first, second, and third positions; and a casing having an opening in which said valve is axially slidable by said thermostat, said casing having a fluid inlet and a fluid outlet, passage means cooperating with said valve when it is in said first position to connect said inlet directly with said outlet, port means communicating with said warm-up space of said cooler and cooperating with said valve when said valve is in said second position to direct a flow of said fluid from said inlet and through said warm-up space to said outlet whereby the walls of said cooling space will be heated and the oil to an extent cooled, and port means communicating with said cooling space of said cooler and cooperating with said valve when said valve is in said third position to direct a flow of said fluid from said inlet and through said cooling space to said outlet.

2. In an oil cooling device of the class described, the combination of: a cooler having walls forming a cooling space in which the oil to be cooled is brought into heat exchange relation to a cooling medium, and a warm-up space contiguous to said cooling space through which heated oil may be passed for the purpose of warming up the walls of said cooling space; an axially slidable valve; thermostat means connected to said valve and operating to move the same between first, second, and third positions; and a casing having an opening in which said valve is axially slidable by said thermostat, said casing having a fluid inlet and a fluid outlet and a space receiving said thermostat means wherein it will always be exposed to a flow of said fluid, passage means cooperating with said valve when it is in said first position to connect said inlet directly with said outlet, port means communicating with said warm-up space of said cooler and cooperating with said valve when said valve is in said second position to direct a flow of said fluid from said inlet and through said warm-up space to said outlet whereby the walls of said cooling space will be heated and the oil to an extent cooled, and port means communicating with said cooling space of said cooler and cooperating with said valve when said valve is in said third position to direct a flow of said fluid from said inlet and through said cooling space to said outlet.

3. In an oil cooling device of the class described, the combination of: a cooler having walls forming a cooling space in which the oil to be cooled is brought into heat exchange relation to a cooling medium, and a warm-up space contiguous to said cooling space through which heated oil may be passed for the purpose of warming up the walls of said cooling space; an axially slidable valve; thermostat means exposed to a flow of said fluid, said thermostat means being connected to said valve and operating to move the same between first, second, and third positions; and a casing having an opening in which said valve is axially slidable by said thermostat, said casing having a fluid inlet and a fluid outlet, passage means cooperating with said valve when it is in said first position to connect said inlet directly with said outlet, port means communicating with said warm-up space of said cooler and cooperating with said valve when said valve is in said second position to direct a flow of said fluid from said inlet and through said warm-up space to said outlet whereby the walls of said cooling space will be heated and the oil to an extent cooled, port means communicating with said cooling space of said cooler and cooperating with said valve when said valve is in said third position to direct a flow of said fluid from said inlet and through said cooling space to said outlet, and a bypass passage having communication with said inlet and said outlet for a flow of said fluid from said inlet to said outlet, there being a pressure responsive bypass control valve in said bypass passage.

4. In an oil cooling device of the class described, the combination of: a cooler having walls forming a cooling space in which the oil to be cooled is brought into heat exchange relation to a cooling medium, and a warm-up space contiguous to said cooling space through which heated oil may be passed for the purpose of warming up the walls of said cooling space; an axially slidable valve; thermostat means connected to said valve and operating to move the same between first, second, and third positions; and a casing having an opening in which said valve is axially slidable by said thermostat, said casing having a fluid inlet and a fluid outlet and a space receiving said thermostat means wherein it will always be exposed to a flow of said fluid, passage means cooperating with said valve when it is in said first position to connect said inlet directly with said outlet, port means communicating with said warm-up space of said cooler and cooperating with said valve when said valve is in said second position to direct a flow of said fluid from said inlet and through said warm-up space to said outlet whereby the walls of said cooling space will be heated and the oil to an extent cooled, port means communicating with said cooling space of said cooler and cooperating with said valve when said valve is in said third position to direct a flow of said fluid from said inlet and through said cooling space to said outlet, and a bypass passage having communication with said inlet and said outlet for a flow of said fluid from said inlet to said outlet, there being a pressure responsive bypass control valve in said bypass passage.

5. In an oil cooling device of the class described, the combination of: a cooler having walls forming a cooling space in which the oil to be cooled is brought into heat exchange relation to a cooling medium, and a warm-up space contiguous to said cooling space through which heated oil may be passed for the purpose of warming up the walls of said cooling space; a valve casing having an inlet and an outlet, and a wall forming a slide valve opening, a direct flow passage from said opening to said outlet, port means communicating with said warm-up space of said cooler and port means communicating with said cooling space of said cooler; thermostat means in said outlet; and a slide valve in said opening connecting to said thermostat means so as to be moved by said thermostat means between first, second and third positions as said thermostat means is relatively cold, warm and hot, said slide valve having parts cooperating when it is in said first position to connect said inlet and said direct passage, parts cooperating when it is in said second position to connect said inlet and said outlet to said port means in such manner that fluid will flow from said inlet through said warm-up space to said outlet whereby the walls of said cooling space will be heated and the oil to an extent cooled, and parts cooperating when it is in said third position to connect said inlet and said outlet with said port means in such manner that fluid will flow from said inlet through said cooling space to said outlet.

6. In an oil cooling device of the class described, the combination of: a cooler having walls forming a cooling space in which the oil to be cooled is brought into heat exchange relation to a cooling medium, and a warm-up space contiguous to said cooling space through which heated oil may be passed for the purpose of warming up the walls of said cooling space; a valve casing having an inlet and an outlet, and a wall forming a slide valve opening, a direct flow passage from said opening to said outlet, port means communicating with said warm-up space of said cooler and port means communicating with said cooling space of said cooler; thermostat means disposed in the path of flow of said fluid from said casing; and a slide valve in said opening connecting to said thermostat means so as to be moved by said thermostat means between first, second, and third positions as said thermostat means is relatively cold, warm, and hot, said slide valve having parts cooperating when it is in said first position to connect said inlet and said direct passage and to close off said ports so that said warm-up space and said cooling space will be isolated from said inlet and said outlet, parts cooperating when it is in said second position to connect said inlet and said outlet to said port means in such manner that fluid will flow from said inlet through said warm-up space to said outlet whereby the walls of said cooling space will be heated and the oil to an extent cooled, and parts cooperating when it is in said third position to connect said inlet and said outlet with said port means in such manner that fluid will flow from said inlet through said cooling space to said outlet.

7. In an oil cooling device of the class described, the combination of: a cooler having walls forming a cooling space in which the oil to be cooled is brought into heat exchange relation to a cooling medium, and a warm-up space contiguous to said cooling space through which heated oil may be passed for the purpose of warming up the walls of said cooling space; a valve casing having an inlet and an outlet, and a wall forming a slide valve opening, direct passage from said opening to said outlet, a common port through which oil may be conducted from said opening to the interior of said cooling space and said warm-up space, a warm-up exit port for communicating with said warm-up space and a cooler exit port for communication with said cooling space of said cooler; thermostat means exposed to the flow of fluid from said casing; and a slide valve means in said opening connected to said thermostat means so as to be moved by said thermostat means between first, second and third positions as said thermostat means is relatively cold, warm and hot, said slide valve having parts cooperating when it is in said first position to connect said inlet and said direct passage whereby fluid may flow directly from said inlet to said outlet, parts cooperating when said valve is in said second position to connect said common port to said inlet and said warm-up exit port to said outlet, and parts cooperating when said valve is in said third position to connect said common port to said inlet and said cooler exit port to said outlet.

8. In an oil cooling device of the class described the combination of: a cooler having walls forming a cooling space in which the oil to be cooled is brought into heat exchange relation to a cooling medium, and a warm-up space contiguous to said cooling space through which heated oil may be passed for the purpose of warming up the walls of said cooling space; a valve casing having an inlet and an outlet, and a wall forming a slide valve opening, direct passage from said opening to said outlet, a common port through which oil may be conducted from said opening to the interior of said cooling space and said warm-up space, a warm-up exit port for communicating with said warm-up space and a cooler exit port for communication with said cooling space of said cooler; thermostat means exposed to the flow of fluid from said casing; and a slide valve means in said opening connected to said thermostat means so as to be moved by said thermostat means between first, second and third positions as said thermostat means is relatively cold, warm, and hot, said slide valve having parts operating when it is in said first position to connect said inlet and said direct passage whereby fluid may flow directly from said inlet to said outlet, said common port being then closed so that fluid under pressure from said inlet will not pass therethrough, parts cooperating when said valve is in said second position to connect said common port to said inlet and said warm-up exit port to said outlet, and parts cooperating when said valve is in said third position to connect said common port to said inlet and said cooler exit port to said outlet.

9. In an oil cooling device of the class described, the combination of: a cooler having walls forming a cooling space in which the oil to be cooled is brought into heat exchange relation to a cooling medium, and a warm-up space contiguous to said cooling space through which heated oil may be passed for the purpose of warming up the walls of said cooling space; a valve casing having an inlet and an outlet, and a wall forming a slide valve opening, direct passage from said opening to said outlet, a common port through which oil may be conducted from said opening to the interior of said cooling space and said warm-up space, a warm-up exit port for communication with said warm-up space and a cooler exit port for communication with said cooling space of said cooler; thermostat means exposed to the flow of fluid from said casing; and a slide valve means in said opening connected to said thermostat means so as to be moved by said thermostat means between first, second and third positions as said thermostat means is relatively cold, warm, and hot, said slide valve having parts cooperating when it is in said first position to connect said inlet and said direct passage whereby fluid may flow directly from said inlet to said outlet, said common warm-up exit and said cooler exit ports being then closed so that fluid under pressure from said inlet and said outlet will not pass therethrough, parts cooperating when said valve is in said second position to connect said common port to said inlet and said warm-up exit port to said outlet, and parts cooperating when said valve is in said third position to close said warm-up exit port and to connect said common port to said inlet and said cooler exit port to said outlet.

10. In an oil cooling device of the class described, the combination of: a cooler having walls forming a cooling space in which the oil to be cooled is brought into heat exchange relation to a cooling medium, and a warm-up space contiguous to said cooling space through which heated oil may be passed for the purpose of warming up the walls of said cooling space; a valve casing having a slide valve bore extending therein, a direct flow port, inlet port, common cooler and warm-up entrance ports, warm-up exit port, outlet port and cooler exit port disposed in series along said bore and each being connected therewith, there being a direct flow passage connecting said direct flow port with said outlet port; and a slide valve movable in said bore between first, second and third positions, said valve having thereon a first barrier which is carried into a position between said direct flow port and said inlet port when said valve is moved from its first position into a second and third positions, a barrier thereon positioned so as to obstruct said common entrance port when said valve is in said first position, to uncover said common entrance port and connect the same with said inlet port when said valve is moved into said second position and to obstruct said warm-up exit port when said valve is moved into said third position, a barrier thereon positioned so that when said valve is in said first position it will lie in said bore between said warm-up exit port and said outlet port and to move into a position where it will not obstruct flow from said warm-up exit port to said outlet port when said valve is in said second and third positions, and a barrier thereon positioned so as to obstruct said cooler exit port when said valve is in said first and second positions thereof and to uncover said cooler exit port so that fluid may flow therefrom through said bore to said outlet port when said valve is in said third position.

11. In an oil cooling device of the class described, the combination of: a cooler having walls forming a cooling space in which the oil to be cooled is brought into heat exchange relation to a cooling medium, and a warm-up space contiguous to said cooling space through which heated oil may be passed for the purpose of warming up the walls of said cooling space; a valve casing having a slide valve bore extending therein, a direct flow port, inlet port, common cooler and warm-up entrance ports, warm-up exit port, outlet port and cooler exit port disposed in series along said bore and each being connected therewith, there being a direct flow passage connecting said direct flow port with said outlet port; and a slide valve movable in said bore between first, second and third positions, said valve having thereon a first barrier which is carried into a position between said direct flow port and said inlet port when said valve is moved from its first position into its second and third positions, a barrier thereon positioned so as to obstruct said common entrance port when said valve is in said first position, to uncover said common entrance port and connect the same with said inlet port when said valve is moved into said second position and to obstruct said warm-up exit port when said valve is moved into said third position, a barrier thereon positioned so that when said valve is in said first position it will lie in said bore between said warm-up exit port and said outlet port and to move into a position where it will not obstruct flow from said warm-up exit port to said outlet port when said valve is in said second and third positions, and a barrier thereon positioned so as to obstruct said cooler exit port when said valve is in said first and second positions thereof and to uncover said cooler exit port so that fluid may flow therefrom through said bore to said outlet port when said valve is in said third position, the ends of said bore being closed and there being a balancing passage through said valve from end to end thereof.

12. In an oil cooling device of the class described, the combination of: a cooler having walls forming a cooling space in which the oil to be cooled is brought into heat exchange relation to a cooling medium, and a warm-up space contiguous to said cooling space through which heated oil may be passed for the purpose of warming up the walls of said cooling space; a valve casing having an inlet and an outlet, and a wall forming a slide valve opening, a direct flow passage from said opening to said outlet, port means communicating with said warm-up space of said cooler and port means communicating with said cooling space of said cooler; thermostat means in said outlet; and a slide valve in said opening connecting to said thermostat means so as to be moved by said thermostat means between first, second and third positions as said thermostat means is relatively cold, warm, and hot, said slide valve having parts cooperating when it is in said first position to connect said inlet and said direct passage, parts cooperating when it is in said second position to connect said inlet and said outlet to said port means in such manner that fluid will flow from said inlet through said warm-up space to said outlet, and parts cooperating when it is in said third position to connect said inlet and said outlet with said port means in such manner that fluid will flow from said inlet through said cooling space to said outlet, the ends of said opening of said casing being closed so that chambers are formed adjacent the ends of said valve, and there being means forming a pressure balancing passage connecting said chambers.

13. In an oil cooling device of the class described, the combination of: a cooler having walls forming a cooling space in which the oil to be cooled is brought into heat exchange relation to a cooling medium, and a warm-up space contiguous to said cooling space through which heated oil may be passed for the purpose of warming up the walls of said cooling space; a valve casing having a slide valve bore extending therein, a direct flow port, inlet port, common cooler and warm-up entrance ports, warm-up exit port, outlet port and cooler exit port disposed in series along said bore and each being connected therewith, there being a direct flow passage connecting said direct flow port with said outlet port; a slide valve movable in said bore between first, second, and third positions, said valve having thereon a first barrier which is carried into a position between said direct flow port and said inlet port when said valve is moved from its first position into its second and third positions, a barrier thereon positioned so as to obstruct said common entrance port when said valve is in said first position, to uncover said common entrance port and connect the same with said inlet port when said valve is moved into said second position and to obstruct said warm-up exit port when said valve is moved into said third position, a barrier thereon positioned so that when said valve is in said first position it will lie in said bore between said warm-up exit port and said outlet port and to move into a position where it will not obstruct flow from said warm-up exit port to said outlet port when said valve is in said second and third positions, and a barrier thereon positioned so as to obstruct said cooler exit port when said valve is in said first and second positions thereof and to uncover said cooler exit port so that fluid may flow therefrom through said bore to said outlet port when said valve is in said third position; a thermostat in said outlet port; and a crank swung by said thermostat, there being means connecting said crank to said valve so that said valve will be moved between said first, second, and third positions thereof as said thermostat is respectively relatively cold, warm, and hot.

14. In an oil cooling device of the class described, the combination of: a cooler having walls forming a cooling space in which the oil to be cooled is brought into heat exchange relation to a cooling medium, and a warm-up space contiguous to said cooling space through which heated oil may be passed for the purpose of warming up the walls of said cooling space; a valve casing having a slide valve bore extending therein, a direct flow port, inlet port, common cooler and warm-up entrance ports, warm-up exit port, outlet port and cooler exit port disposed in series along said bore and each being connected therewith, there being a direct flow passage connecting said direct flow port with said outlet port; a slide valve movable in said bore between first, second, and third positions, said valve having thereon a first barrier which is carried into a position between said direct flow port and said inlet port when said valve is moved from its first position into its second and third positions, a barrier thereon positioned so as to obstruct said common entrance port when said valve is in said first position, to uncover said common entrance port and connect the same with said inlet port when said valve is moved into said second position and to obstruct said warm-up exit port when said valve is moved into said third position, a barrier thereon positioned so that when said valve is in said first position it will lie in said bore between said warm-up exit port and said outlet port and to move into a position where it will not obstruct flow from said warm-up exit port to said outlet port when said valve is in said second and third positions, and a barrier thereon positioned so as to obstruct said cooler exit port when said valve is in said first and second positions thereof and to uncover said cooler exit port so that fluid may flow therefrom through said bore to said outlet port when said valve is in said third position; a thermostat in said outlet port; a crank swung by said thermostat, there being means connecting said crank to said valve so that said valve will be moved between said first, second, and third positions thereof as said thermostat is respectively relatively cold, warm, and hot; and rolling type bearing means in said casing supporting said valve for axial movement in said bore.

15. In an oil cooling device of the class described, the combination of: a cooler having walls forming a cooling space in which the oil to be cooled is brought into heat exchange relation to a cooling medium, and a warm-up space contiguous to said cooling space through which heated oil may be passed for the purpose of warming up the walls of said cooling space; a valve casing having a slide valve bore extending therein, a direct flow port, inlet port, common cooler and warm-up entrance ports, warm-up exit port, outlet port and cooler exit port disposed in series along said bore and each being connected therewith, there being a direct flow passage connecting said direct flow port with said outlet port; and a slide valve movable in said bore between first, second and third positions, said valve having thereon a first barrier which is carried into a position between said direct flow port and said inlet port when said valve is moved from its first position into its second and third positions, a barrier thereon positioned so as to obstruct said common entrance port when said valve is in said first position, t uncover said common entrance port and connect the same with said inlet port when said valve is moved into said second position and to obstruct said warm-up exit port when said valve is moved into said third position, a barrier thereon positioned so that when said valve is in said first position it will lie in said bore between said warm-up exit port and said outlet port and to move into a position where it will not obstruct flow from said warm-up exit port to said outlet port when said valve is in said second and third positions, and a barrier thereon positioned so as to obstruct said cooler exit port when said valve is in said first and second positions thereof and to uncover said cooler exit port so that fluid may flow therefrom through said bore to said outlet port when said valve is in said third position, said barriers comprising a plurality of sharp edged discs, the sharp edges of said discs lying in close proximity to the wall of said bore.

WALTER R. RAMSAUR.